(12) United States Patent
Ryu et al.

(10) Patent No.: US 12,315,875 B2
(45) Date of Patent: May 27, 2025

(54) ALL-SOLID-STATE BATTERIES COMPRISING COMPOSITE ELECTRODE

(71) Applicant: LG ENERGY SOLUTION, LTD., Seoul (KR)

(72) Inventors: Ji Hoon Ryu, Daejeon (KR); Eun Bee Kim, Daejeon (KR); Jung Pil Lee, Daejeon (KR); Suk Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 688 days.

(21) Appl. No.: 17/428,311

(22) PCT Filed: May 6, 2020

(86) PCT No.: PCT/KR2020/005934
§ 371 (c)(1),
(2) Date: Aug. 4, 2021

(87) PCT Pub. No.: WO2020/226412
PCT Pub. Date: Nov. 12, 2020

(65) Prior Publication Data
US 2022/0231326 A1    Jul. 21, 2022

(30) Foreign Application Priority Data
May 8, 2019   (KR) ........................ 10-2019-0053694

(51) Int. Cl.
*H01M 10/0562* (2010.01)
*H01M 4/02* (2006.01)
(Continued)

(52) U.S. Cl.
CPC ... *H01M 10/0562* (2013.01); *H01M 10/0525* (2013.01); *H01M 2004/027* (2013.01);
(Continued)

(58) Field of Classification Search
CPC ...... H01M 4/131; H01M 4/133; H01M 4/583; H01M 4/62; H01M 10/0525;
(Continued)

(56) References Cited

U.S. PATENT DOCUMENTS

2003/0087723 A1   5/2003  Yoshikawa
2009/0191461 A1   7/2009  Nakamura
(Continued)

FOREIGN PATENT DOCUMENTS

CN    101507013 A   8/2009
CN    102332579 A   1/2012
(Continued)

OTHER PUBLICATIONS

Machine Translation of Okochi (Year: 2020).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

Disclosed is an all-solid-state battery comprising an electrode assembly and a solid electrolyte, wherein the electrode assembly comprises a structure in which plate-shaped electrodes are stacked; and the electrodes include a relatively high heat-generating first electrode and a relatively low heat-generating second electrode, wherein the first electrode is disposed in a center of the electrode assembly, the all-solid-state battery with improved performance by increasing the temperature of the battery without adding additional members.

12 Claims, 6 Drawing Sheets

(51) Int. Cl.
   *H01M 4/583*      (2010.01)
   *H01M 10/0525*    (2010.01)
(52) U.S. Cl.
   CPC .... *H01M 4/583* (2013.01); *H01M 2300/0082* (2013.01); *H01M 2300/0091* (2013.01)
(58) Field of Classification Search
   CPC ......... H01M 10/0562; H01M 10/0565; H01M 10/0585; H01M 2004/027; H01M 2300/0082; H01M 2300/0091
   See application file for complete search history.

(56) References Cited

U.S. PATENT DOCUMENTS

| | | | |
|---|---|---|---|
| 2012/0196180 A1 | 8/2012 | Nakamura | |
| 2016/0329597 A1 | 11/2016 | Park | |
| 2018/0254480 A1* | 9/2018 | Kamo | H01M 4/139 |
| 2019/0372085 A1* | 12/2019 | Yang | H01M 10/6554 |
| 2020/0028166 A1* | 1/2020 | Tanaka | H01M 4/483 |

FOREIGN PATENT DOCUMENTS

| | | | | |
|---|---|---|---|---|
| CN | 108832171 A | | 11/2018 | |
| JP | 5-82140 A | | 4/1993 | |
| JP | 2001-357854 A | | 12/2001 | |
| JP | 2004-31269 A | | 1/2004 | |
| JP | 2008-78109 A | | 4/2008 | |
| JP | 2009-87814 A | | 4/2009 | |
| JP | 2009-176599 A | | 8/2009 | |
| JP | 5314872 B2 | | 10/2013 | |
| JP | 2014-143143 A | | 8/2014 | |
| JP | 2018-10848 A | | 1/2018 | |
| JP | 6460063 B2 | | 1/2019 | |
| JP | 2020107604 A | * | 7/2020 | ........ H01M 10/0525 |
| KR | 10-2015-0084513 A | | 7/2015 | |
| KR | 10-2016-0087189 A | | 7/2016 | |
| KR | 10-2017-0030791 A | | 3/2017 | |
| KR | 10-1760647 B1 | | 8/2017 | |
| KR | 10-2017-0135180 A | | 12/2017 | |
| KR | 10-2018-0073442 A | | 7/2018 | |

OTHER PUBLICATIONS

International Search Report for PCT/KR2020/005834 mailed on Aug. 6, 2020.
Extended European Search Report for European Application No. 20801469.6, dated Jan. 25, 2022.

* cited by examiner

【FIG. 1】
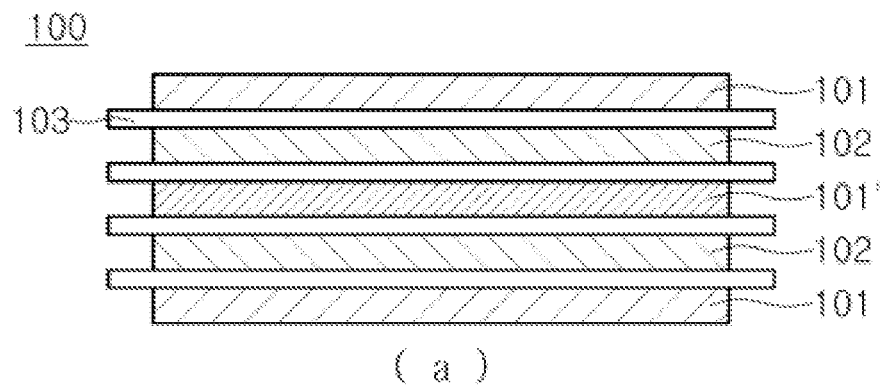
(a)
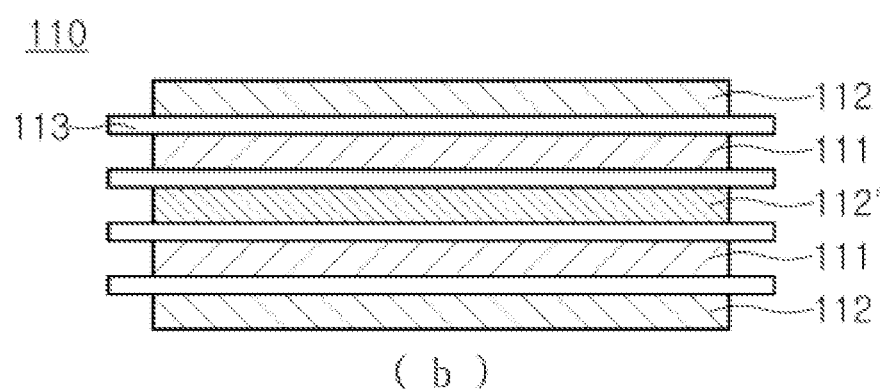
(b)

[FIG. 2]
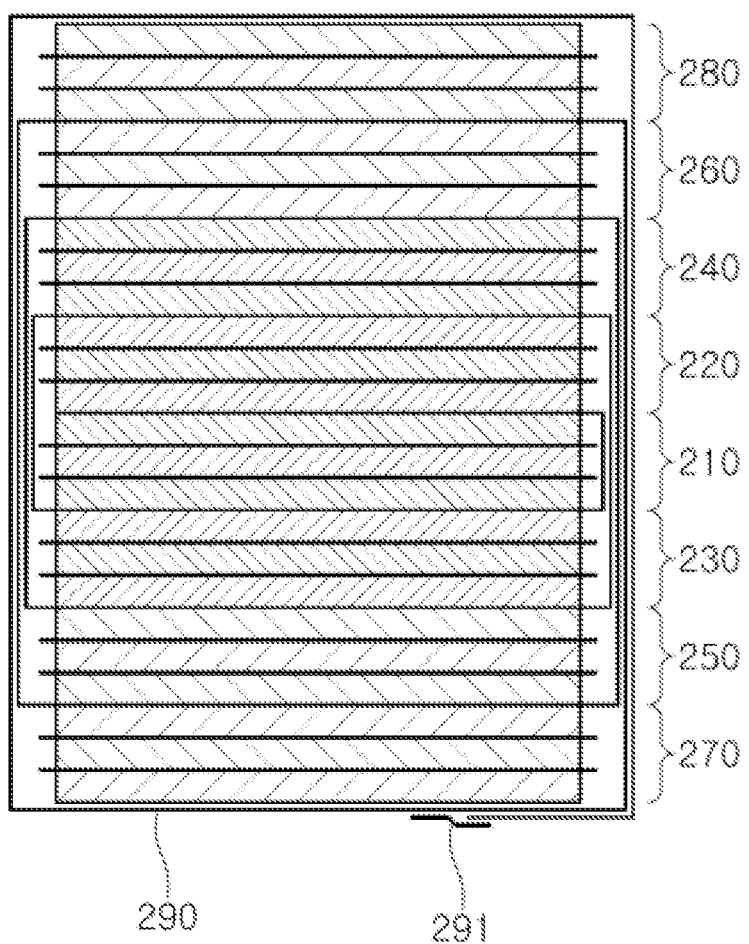

[FIG. 3]
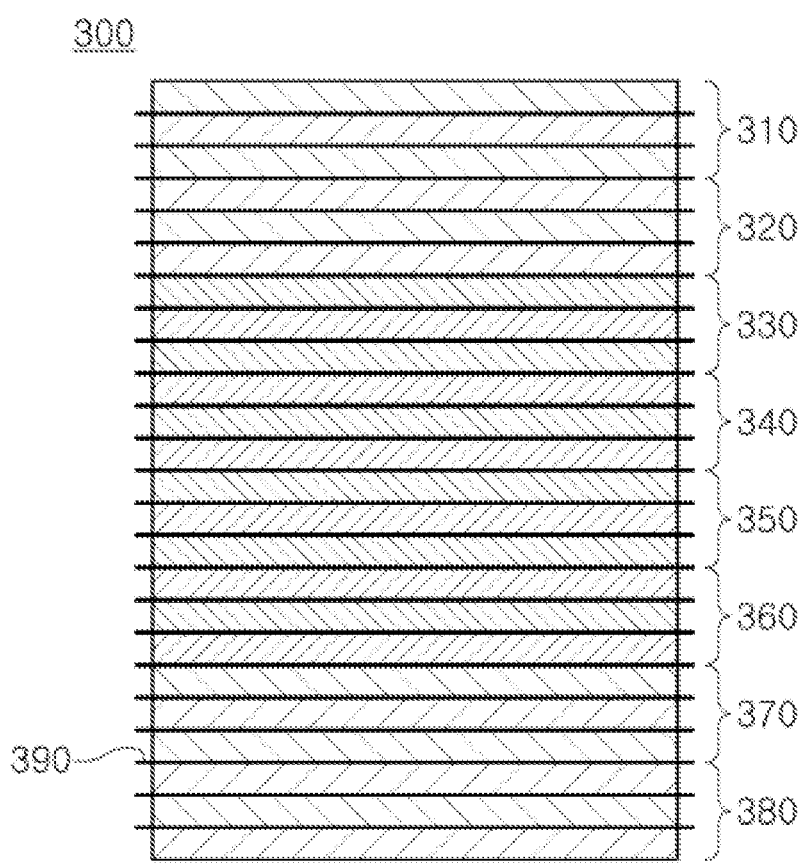

[FIG. 4]
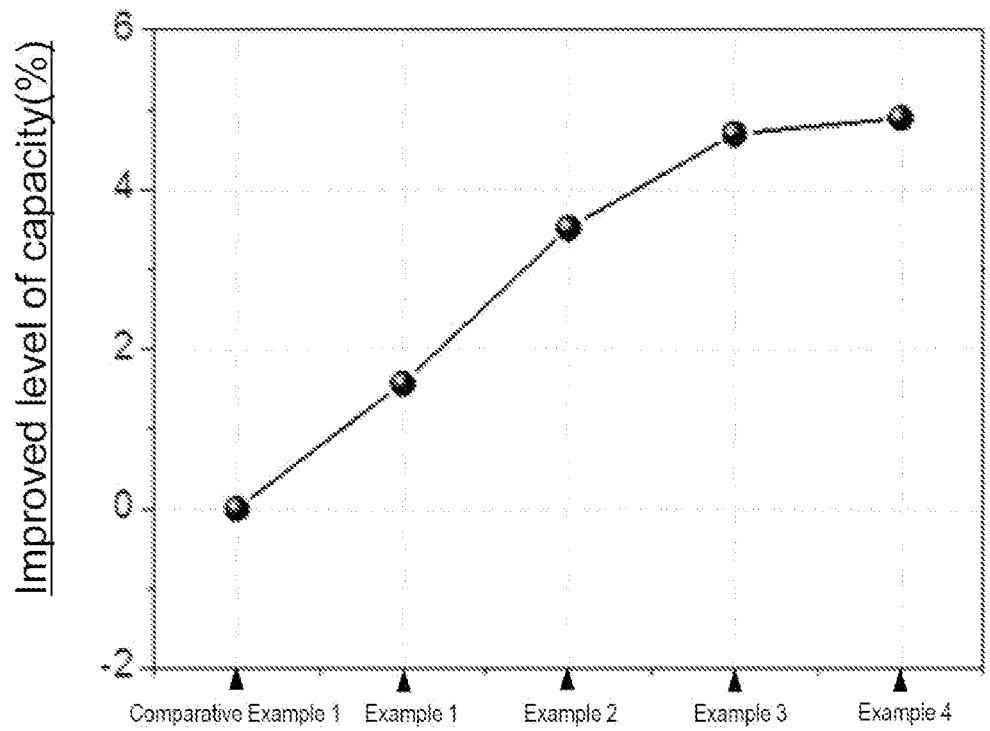

[FIG. 5]
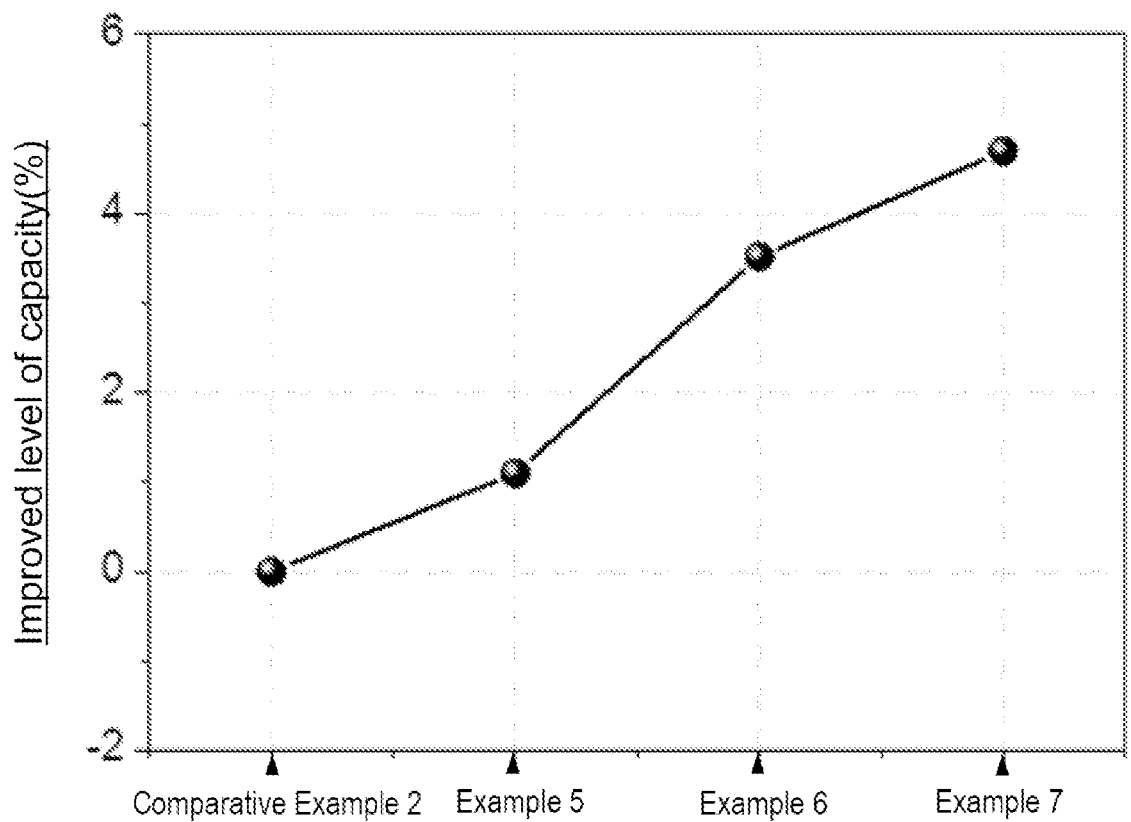

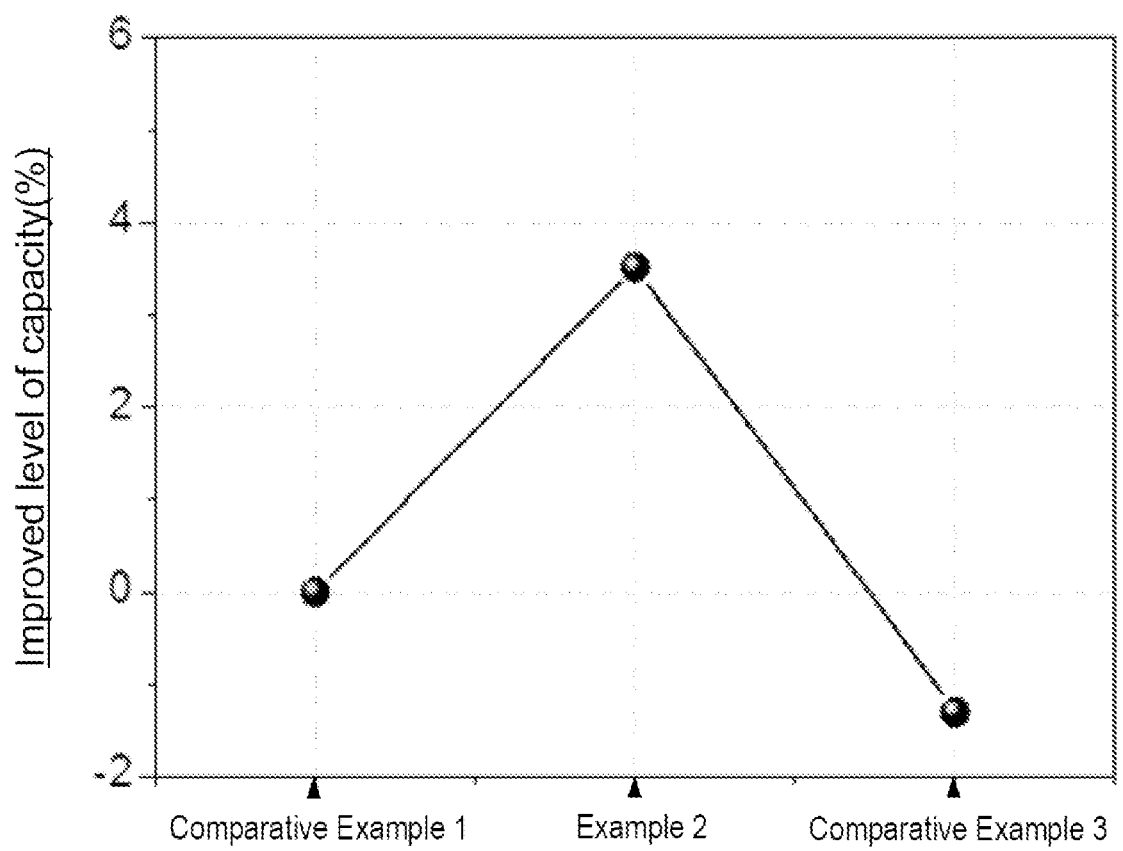
[FIG. 6]

ALL-SOLID-STATE BATTERIES COMPRISING COMPOSITE ELECTRODE

TECHNICAL FIELD

This application claims the benefit of priority to Korean Patent Application No. 2019-0053694 filed on May 8, 2019, the disclosure of which is hereby incorporated by reference herein its entirety.

The present invention relates to an all-solid-state battery comprising a composite electrode capable of complementing the low electrochemical performance of all-solid-state batteries by disposing an electrode generating a large amount of heat in the center of the electrode assembly.

BACKGROUND ART

As mobile electronic devices including mobile phones are required to have multiple functions, the demand for lithium secondary batteries with high energy density has been increased.

In addition, in order to use lithium secondary batteries in power storage devices and electric vehicles requiring high capacity and high output energy sources, research on safety improvement and high voltage of lithium secondary batteries has been actively conducted.

A lithium ion secondary battery, which is a kind of the lithium secondary batteries, has advantages of high energy density, low self-discharge rate, and long lifespan compared to a nickel manganese battery or a nickel cadmium battery. However, the stability problem against overheating with the lithium ion secondary battery has been pointed out as a disadvantage.

In order to overcome the problems of the lithium ion secondary battery, an all-solid-state battery has been proposed as an alternative. The all-solid-state battery may comprise an electrolyte layer including a solid electrolyte, and a positive electrode layer and a negative electrode layer including a solid electrolyte formed on both sides of the electrolyte layer, and may be configured to have a structure in which a current collector may be coupled to each of the positive electrode layer and the negative electrode layer.

When compared to a conventional lithium-ion secondary battery, the all-solid-state battery has superior safety than the conventional lithium-ion secondary battery. However, since the solid electrolyte has low ion conductivity, the all-solid-state battery has a problem of poor performance such as capacity and output.

In order to solve the problems described above, a technology using the characteristics of an all-solid-state battery in which the ion conductivity is greatly improved when the temperature is increased has been proposed as an alternative.

In particular, Patent Document 1 discloses a secondary battery in which a heat generation unit insulated from electrodes is disposed on a current collector, the secondary battery provided with a temperature control unit and a current-carrying control unit for detecting the temperature of the inside of the battery and controlling a current into the heat generation unit.

When a separate heat generation unit is provided as in Patent Document 1, there are problems in that energy density is lowered due to the increase of the overall size of the battery and energy is wasted when a separate power is required for an external heat generation unit.

Patent Document 2 discloses a non-aqueous electrolyte secondary battery capable of suppressing heat generation of the battery, the nonaqueous electrolyte secondary battery providing a PTC layer between a positive electrode active material layer and a positive electrode current collector, wherein the PTC layer is composed of a collection of conductive particles, thereby blocking the flow of current under heating conditions due to overcharging of the battery.

Patent Document 3 discloses a non-aqueous secondary battery having a structure in which a conductive layer covers an electrode current collector, the conductive layer including a crystalline thermoplastic resin having a function of a constant temperature coefficient resistor whose resistance value increases when the temperature rises, a conductive material, and a binder.

Patent Document 2 and Patent Document 3 only disclose a technology for preventing heat generation by blocking current when the battery temperature rises, but fail to provide a method for maintaining the heat generation state of the battery.

Patent Document 4 relates to a battery cell in which a heating element that emits resistance heat by interaction inside the battery is disposed at one or both interfaces of a unit cell located in the center of an electrode assembly.

Patent Document 4 discloses the battery cell comprising the heating element that increases the internal temperature of the battery. However, since the thickness of the battery cell comprising the heating element increases or the thickness of the electrode assembly decreases relatively, there is a problem in that energy density decreases.

Therefore, there is a high need for a technology capable of improving the function of a battery by increasing the battery temperature in an all-solid-state battery, and at the same time, capable of preventing energy density from being lowered in an all-solid-state battery without increasing the volume of a battery cell and without adding a separate external power.

PRIOR ART DOCUMENT (Patent Document 1) Japanese Patent No. 5314872 (2013 Jul. 12)
(Patent Document 2) Japanese Patent Application Publication No. 2009-176599 (2009 Aug. 6)
(Patent Document 3) Japanese Patent Application Publication No. 2001-357854 (2001 Dec. 26)
(Patent Document 4) Korean Patent No. 1760647 (2017 Jul. 18)

DISCLOSURE

Technical Problem

The present invention has been made in view of the above problems, and it is an object of the present invention to provide an all-solid-state battery having characteristics of high capacity and high energy density by raising the battery temperature itself by heat generated in a normal operating environment of the battery by applying an electrode having a large amount of heat generation to a part of electrodes of an electrode assembly.

Technical Solution

In order to accomplish the above objects, the present invention provides an all-solid-state battery comprising an electrode assembly and a solid electrolyte, wherein the electrode assembly includes a structure in which plate-shaped electrodes are stacked; and the electrodes include a relatively high heat-generating first electrode and a relatively low heat-generating second electrode, wherein the first electrode is disposed in a center of the electrode assembly.

In a concrete example, the electrode assembly may be a stacked type electrode assembly; and the first electrode and the second electrode may have the same composition of an active material, wherein an amount ratio of the solid electrolyte in the first electrode may be higher than an amount ratio of the solid electrolyte in the second electrode.

Alternatively, the electrode assembly may be a laminated/stacked type electrode assembly or a stacked/folded type electrode assembly comprising a plurality of unit cells, wherein the plurality of unit cells are configured to have a first unit cell including the first electrode and a second unit cell including the second electrode. The first electrode and the second electrode may have the same composition of an active material, wherein an amount ratio of the solid electrolyte in the first electrode may be higher than an amount ratio of the solid electrolyte in the second electrode.

In another concrete example, the electrode assembly may be a stacked type electrode assembly; and an active material of the first electrode and an active material of the second electrode may be a relatively high heat-generating negative electrode active material and a relatively low heat-generating negative electrode active material selected from among hard carbon, soft carbon, artificial graphite, natural graphite coated with artificial graphite, natural graphite, and silicon oxide.

Alternatively, the electrode assembly may be a laminated/stacked type electrode assembly or a stacked/folded type electrode assembly comprising a plurality of unit cells; the plurality of unit cells may be configured to have a first unit cell including the first electrode and a second unit cell including the second electrode; and an active material of the first electrode and an active material of the second electrode may be a relatively high heat-generating negative electrode active material and a relatively low heat-generating negative electrode active material selected from among hard carbon, soft carbon, artificial graphite, natural graphite coated with artificial graphite, natural graphite, and silicon oxide.

In addition, each of the first unit cell and the second unit cell may include a uniform active material.

The electrode may be a positive electrode or a negative electrode, or a positive electrode and a negative electrode.

The solid electrolyte may be a sulfide-based solid electrolyte, an oxide-based solid electrolyte or a polymer-based solid electrolyte.

A temperature of the first electrode may be transferred to the second electrode to increase an internal temperature of the battery.

The all-solid-state battery may have a larger capacity at subzero temperatures compared to an all-solid-state battery composed of a single electrode and having the same capacity at room temperature.

The present invention provides a battery pack comprising the all-solid-state battery, and a device comprising the battery pack. The device may be any one selected from a group consisting of mobile electronic devices, wearable electronic devices, tablet computers, laptop computers, electric vehicles, and power storage devices.

BRIEF DESCRIPTION OF DRAWINGS

FIG. 1 is side views showing stacked type electrode assemblies including a plurality of positive electrodes and negative electrodes.

FIG. 2 is a side view showing a stacked/folded type electrode assembly according to the present invention.

FIG. 3 is a side view showing a laminated/folded type electrode assembly according to the present invention.

FIG. 4 is a graph showing results according to Experimental Example 1.

FIG. 5 is a graph showing results according to Experimental Example 2.

FIG. 6 is a graph showing results according to Experimental Example 3.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

The present invention relates to an all-solid-state battery comprising an electrode assembly and a solid electrolyte, wherein the electrode assembly has a structure in which plate-shaped electrodes are stacked.

In general, the electrode assembly may be divided into a structure in which plate-shaped electrodes are stacked such as a stacked type electrode assembly, a stacked/folded type electrode assembly, and a laminated/stacked electrode assembly, or a jelly-roll type electrode assembly structure in which a long sheet-type electrode is wound.

Since the jelly-roll type electrode assembly includes one positive electrode and one negative electrode, the jelly-roll type electrode assembly has a structure in which it is difficult to diversify the configuration of the electrode. On the other hand, since the stacked type, stacked/folded type and laminated/stacked type electrode assemblies are configured such that a plurality of plate-shaped electrodes are stacked, various types of positive electrodes and negative electrodes can be applied.

Accordingly, an electrode assembly of an all-solid-state battery according to the present invention includes a relatively high heat-generating first electrode and a relatively low heat-generating second electrode, wherein the first electrode may be disposed in a center of the electrode assembly.

The relatively high heat-generating first electrode used in the present specification is an electrode having a relatively large amount of heat generated, and may be an electrode using a high heat-generating electrode active material or an electrode having an amount ratio of solid electrolyte higher than that of the second electrode. The relatively low heat-generating second electrode used in the present specification is a relatively low heat-generating electrode compared to the first electrode, and may be an electrode using a low heat-generating electrode active material or an electrode having an amount ratio of solid electrolyte lower than that of the first electrode.

The first electrode may be located in the center of the electrode assembly, and thus, the first electrode may be disposed in the center of the electrode assembly composed of a plurality of electrodes. Alternatively, a unit cell including the first electrode or composed of the first electrode may be disposed in the center of the electrode assembly. By placing the first electrode having a high exothermic property in the center of the electrode assembly, the temperature of the first electrode can be transferred to the second electrode, thereby increasing the internal temperature of the battery.

In general, the high heat-generating first electrode may damage the electrode active material or the internal structure of the electrode due to a high rate, thereby deteriorating a lifespan characteristic. However, the low heat-generating second electrode, which exhibits a relatively stable rate, may exhibit a relatively excellent lifespan characteristic due to less damage to the electrode active material or the internal structure of the electrode.

Therefore, in order to increase the overall temperature of the electrode assembly, when the electrode assembly includes both the high heat-generating first electrode and the second electrode having a stable lifespan characteristic, the first electrode and the second electrode may complement their inferior characteristics to each other.

In this regard, FIG. 1 is side views showing stacked type electrode assemblies including a plurality of positive electrodes and negative electrodes.

Referring to FIG. 1, an electrode assembly 100 of FIG. 1(a) is a stacked type electrode assembly having a structure in which a plurality of positive electrodes 101 and 101' and a plurality of negative electrodes 102 are stacked with a solid electrolyte layer 103 interposed therebetween.

The positive electrode 101' disposed at the center of the electrode assembly 100 is a high heat-generating first electrode, and the positive electrode 101 disposed at an outer side of the electrode assembly 100 is a low heat-generating second electrode. In addition, in consideration of the performance of the battery, the two negative electrodes 102 may be applied simultaneously or selectively as a high heat-generating first negative electrode or as a low heat-generating second negative electrode. As described above, by disposing the high heat-generating positive electrode at the center of the electrode assembly, thermal energy may be transferred in opposite directions based on a stacking direction of the electrodes, thereby uniformly raising the internal temperature of the battery.

An electrode assembly 110 of FIG. 1(b) is a stacked type electrode assembly having a structure in which a plurality of positive electrodes 111 and a plurality of negative electrodes 112 and 112' are stacked with a solid electrolyte layer 113 interposed therebetween.

The negative electrode 112' disposed at the center of the electrode assembly 110 may be a high heat-generating first negative electrode, and the negative electrode 112 disposed at an outer side of the electrode assembly may be a low heat-generating second negative electrode.

In addition, in consideration of the performance of the battery, the two positive electrodes 111 may be applied simultaneously or selectively as a high heat-generating first positive electrode or as a low heat-generating second positive electrode. As described above, by disposing the high heat-generating negative electrode at the center of the electrode assembly, thermal energy may be transferred in opposite directions based on a stacking direction of the electrodes, thereby uniformly raising the internal temperature of the battery.

In a concrete example, each of the positive electrode 101, the positive electrode 101', the negative electrode 112, and the negative electrode 112' has a difference in the amount ratio of the solid electrolyte, while the composition of the electrode active material may be the same.

For example, the negative electrode 112 and the negative electrode 112' may be artificial graphite, natural graphite, natural graphite coated with artificial graphite, silicon oxide, hard carbon, or soft carbon.

In addition, the positive electrode 101 and the positive electrode 101' may be Ni—Co—Mn oxide ($LiNCMO_2$ (LiNCM)), lithium nickel oxide ($LiNiO_2$(LNO)), oxide of olivine structure (LFP($LiFePO_4$) or $LiMnPO_4$(LMP)), lithium cobalt oxide ($LiCoO_2$(LCO)) or lithium manganese oxide ($LiMn_2O_4$(LMO)).

In another concrete example, the positive electrode 101' and the negative electrode 112' may have a form in which a high heat-generating electrode active material is applied, and the positive electrode 101 and the negative electrode 112 may have a form in which a low heat-generating electrode active material is applied.

When the heat generation of negative electrode active materials are listed in order from high to low, it is in the order of hard carbon>soft carbon>artificial graphite>natural graphite coated with artificial graphite>natural graphite>silicon oxide. When the heat generation of positive electrode active materials are listed in order from high to low, it is in the order of LMO>LCO>LiNCM>LNO>LMP, LFP.

The positive electrode 101' and the negative electrode 112' have relatively higher heat generation than the positive electrode 101 and the negative electrode 112. Thus, in consideration of the magnitude of heat generation described above, the relatively high heat-generating positive electrode and negative electrode, and the relatively low heat-generating positive electrode and negative electrode may be selectively applied.

Alternatively, the positive electrode active material and the negative electrode active material may be selected and applied from the electrode active materials divided into a high heat-generating group and a low heat-generating group.

For example, the negative electrode 112 may be one or more selected from the group consisting of artificial graphite, natural graphite, natural graphite coated with artificial graphite, and silicon oxide, and the negative electrode 112' may be one or more selected from the group consisting of hard carbon and soft carbon.

The positive electrode 101 may be one or more selected from the group consisting of Ni—Co—Mn oxide ($LiNCMO_2$, Ni>60%) with Ni of more than 60%, lithium nickel oxide ($LiNiO_2$(LNO)), and olivine-structured oxide (LFP ($LiFePO_4$) or $LiMnPO_4$(LMP)). The positive electrode 101' may be one or more selected from the group consisting of lithium cobalt oxide ($LiCoO_2$(LCO)), lithium manganese oxide ($LiMn_2O_4$(LMO)), and Ni—Co—Mn oxide ($LiNCMO_2$, Ni<60%) with Ni of 60% or less.

FIG. 2 is a side view showing a stacked/folded type electrode assembly according to the present invention.

Referring to FIG. 2, the electrode assembly 200 is a stacked/folded type electrode assembly in which a solid electrolyte layer 290 is compressed while being positioned bi-cell type unit cells 210, 220, 230, 240, 250, 260, 270, and 280 on one side of the solid electrolyte layer 290, the unit cells configured to have a structure of positive electrode/ solid electrolyte layer/negative electrode/solid electrolyte layer/positive electrode or a negative electrode/solid electrolyte layer/positive electrode/solid electrolyte layer/negative electrode. The electrode assembly 200 prevents the solid electrolyte layer 290 from loosening by attaching a fixing tape 291 to an end of the solid electrolyte layer 290.

The electrode assembly 200 is composed of eight unit cells. The unit cells 210, 220, 230, and 240 disposed in the center of the electrode assembly are first unit cells including a first electrode having a high exothermic property that includes an electrode active material having a high amount ratio of solid electrolyte or a large amount of heat generated when compared to the unit cells 250, 260, 270, and 280 disposed at outer sides of the electrode assembly. The unit cells 250, 260, 270, and 280 are second unit cells including a low heat-generating second electrode.

In particular, both of the positive electrode and the negative electrode constituting the first unit cells may be a high heat-generating first positive electrode and a high heat-generating first negative electrode. Alternatively, the high heat-generating first positive electrode or the high heat-generating first negative electrode may be applied to only one of the positive electrode or the negative electrode in the first unit cells.

However, both the positive electrode and the negative electrode constituting the second unit cells may be a low heat-generating second positive electrode and a low heat-generating second negative electrode.

The first positive electrode and the first negative electrode, and the second positive electrode and the second negative electrode may be applied in the same manner as described in the description of FIG. 1, respectively, in the case in which (i) the amount ratio of solid electrolyte is applied differently and the same kind of electrode active material is applied, or (ii) a relatively high heat-generating electrode active material and a relatively low heat-generating electrode active material are applied.

Unlike the unit cells shown in FIG. 2, only two of the first unit cells may be applied to the center, and the second unit cells may be applied to six unit cells excluding the first unit cells. Alternatively, the second unit cells may be applied to the unit cells 270 and 280 located at the outermost part of the electrode assembly, and the first unit cells may be applied to the remaining six unit cells.

In the electrode assembly 200 of FIG. 2, the positive electrode and the negative electrode constituting the first unit cells 210, 220, 230, and 240 may be designed to have the same electrode constituent materials, such as an electrode active material, a conductive agent, and a solid electrolyte. Alternatively, the positive electrode and the negative electrode constituting the first unit cells 210, 220, 230, and 240 may be designed to be selectively different in the type and/or composition ratio of the electrode constituent materials in a state in which the amount of heat generated is higher than that of the second unit cells.

In addition, the positive electrode and the negative electrode constituting the second unit cells 250, 260, 270, and 280 may be designed to have the same electrode constituent materials, such as an active material, a conductive agent, and a solid electrolyte. Alternatively, the positive electrode and the negative electrode constituting the second unit cells 250, 260, 270, and 280 may be designed to be selectively different in the type and/or composition ratio of the electrode constituent materials in a state in which the amount of heat generated is lower than that of the first unit cells.

FIG. 3 is a side view showing a laminated/folded type electrode assembly according to the present invention.

Referring to FIG. 3, the electrode assembly 300 is a laminated/stacked type electrode assembly in which bi-cell type unit cells 310, 320, 330, 340, 350, 360, 370, and 380 having a structure of positive electrode/solid electrolyte layer/negative electrode/solid electrolyte layer/positive electrode or a negative electrode/solid electrolyte layer/positive electrode/solid electrolyte layer/negative electrode are stacked with a solid electrolyte layer 390 interposed therebetween and are heat-sealed.

The unit cells 330, 340, 350, and 360 located in the center of the electrode assembly 300 are high exothermic unit cells having properties corresponding to the unit cells 210, 220, 230, and 240, which are the first unit cells of FIG. 2. The unit cells 310, 320, 370, and 380 located on the outer periphery of the electrode assembly 300 are low exothermic unit cells having properties corresponding to the unit cells 250, 260, 270, and 280, which are the second unit cells of FIG. 2.

Therefore, the description of the unit cells 330, 340, 350, and 360 and the unit cells 310, 320, 370, and 380 of the electrode assembly 300 may be applied in the same manner as the description of the unit cells 210, 220, 230, and 240 and the unit cells 250, 260, 270, and 280 of the electrode assembly 200.

The solid electrolyte may be a sulfide-based solid electrolyte, an oxide-based solid electrolyte or a polymer-based solid electrolyte.

It is preferable for the sulfide-based solid electrolyte to contain a sulfur atom (S), to exhibit ion conductivity of a metal belonging to Group 1 or Group 2 of the periodic table, and to exhibit electronic insulation properties. Although it is preferable that the sulfide-based solid electrolyte contains at least Li, S and P as elements, and has lithium ion conductivity, the sulfide-based solid electrolyte may contain elements other than Li, S and P depending on the purpose or case.

Specifically, examples of the sulfide-based solid electrolyte are as follows. For example, $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2SLi_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2SSiS_2$—$Li_3PO_4$, or $Li_{10}GeP_2S_{12}$ may be used.

An example of a method of synthesizing the sulfide-based solid electrolyte material is an amorphization method. Examples of the amorphization method include a mechanical milling method, a solution method, and a melting and rapid cooling method. Among them, the mechanical milling method is preferable because it is possible to process at room temperature (25° C.) and it has the advantage of simplifying the manufacturing process.

It is preferable for the oxide-based solid electrolyte to contain an oxygen atom (O), to exhibit ion conductivity of a metal belonging to Group 1 or 2 of the periodic table, and to exhibit electrical insulation.

As the oxide-based solid electrolyte, for example, there may be used $Li_{xa}La_{ya}TiO_3$ (xa=0.3 to 0.7 and ya=0.3 to 0.7) (LLT), $Li_{xb}La_{yb}Zr^{zb}M^{bb}{}_{mb}O_{nb}$ ($M^{bb}$ is at least one of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}{}_{zc}O_{nc}$ ($M^{cc}$ is at least one of C, S, Al, Si, Ga, Ge, In, or Sn, xc satisfies 0≤xc≤5, yc satisfies $0 \leq yc \leq 1$, zc satisfies $0 \leq zc \leq 1$, and nc satisfies $0 \leq nc \leq 6$), $Li_{xd}(Al, Ga)_{yd}(Ti, Ge)_{zd}Si_{ad}P_{md}O_{nd}$ (here, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$), $Li_{(3-2xe)}M^{ee}_{xe}D^{ee}O$ (xe satisfies $0 \leq xe \leq 0.1$, $M^{ee}$ is a two-valent metal atom, and $D^{ee}$ indicates a halogen atom or a combination of two or more kinds of halogen atoms), $Li_{xf}Si_{yf}O_{zf}$ ($1 \leq xf \leq 5$, $0 \leq yf \leq 3$, and $1 \leq zf \leq 10$), $Li_{xg}S_{yg}O_{zg}$ ($1 \leq xg \leq 3$, $0 \leq yg \leq 2$, and $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ ($w<1$), $Li_{3.5}Zn_{0.25}GeO_4$ having a lithium super ionic conductor (LISICON) type crystalline structure, $La_{0.55}Li_{0.35}TiO_3$ having a perovskite type crystalline structure, $LiTi_2P_3O_{12}$ having a natrium super ionic conductor (NASICON) type crystalline structure, $Li_{1+xh+yh}(Al, Ga)_{xh}(Ti, Ge)_{2-xh}Si_{yh}P_{3-yh}O_{12}$ (here, $0 \leq xh \leq 1$ and $0 \leq yh \leq 1$), or $Li_7La_3Zr_2O_{12}$ (LLZ) having a garnet type crystalline structure. In addition, a phosphorus compound including Li, P, and O is preferably used. For example, lithium phosphate ($Li_3PO_4$), LiPON in which a portion of oxygen in lithium phosphate is replaced by nitrogen, or $LiPOD^1$ ($D^1$ being at least one selected from among Ti, V, Cr, Mn, Fe, Co, Ni, Cu, Zr, Nb, Mo, Ru, Ag, Ta, W, Pt, and Au) may be used. In addition, $LiA^1ON$ ($A^1$ being at least one selected from among Si, B, Ge, Al, C, and Ga) is preferably used.

The polymer-based solid electrolyte may be a solid polymer electrolyte formed by adding a polymer resin to a lithium salt that is independently solvated or a polymer gel electrolyte formed by impregnating a polymer resin with an organic electrolytic solution containing an organic solvent and lithium salt.

The solid polymer electrolyte is not particularly restricted as long as the solid polymer electrolyte is made of, for example, a polymer material that is ion conductive and is generally used as a solid electrolyte material of the all-solid-state battery. As examples of the solid polymer electrolyte, mention may be made of a polyether-based polymer, a polycarbonate-based polymer, an acrylate-based polymer, a polysiloxane-based polymer, a phosphazene-based polymer, a polyethylene derivative, an alkylene oxide derivative, a phosphoric acid ester polymer, poly agitation lysine, polyester sulfide, polyvinyl alcohol, polyvinylidene fluoride, and a polymer containing an ionic dissociation group. In a concrete embodiment of the present invention, the solid polymer electrolyte may include: a branch-like copolymer formed by copolymerizing an amorphous polymer, such as poly methyl methacrylate (PMMA), polycarbonate, polysiloxane, and/or phosphazene, which is a comonomer, in the main chain of a polyethylene oxide (PEO), which is a polymer resin; a comb-like polymer resin; and a crosslinking polymer resin.

The polymer gel electrolyte includes an organic electrolytic solution including lithium salt and a polymer resin, wherein the organic electrolytic solution is included in an amount of 60 parts by weight to 400 parts by weight based on weight of the polymer resin. Although the polymer resin applied to the polymer gel electrolyte is not limited to specific components, a PVC-based resin, a poly methyl methacrylate (PMMA)-based resin, polyacrylonitrile (PAN), polyvinylidene fluoride (PVdF), and polyvinylidene fluoride hexafluoropropylene (PVdF-HFP) may be included.

The lithium salt is a lithium salt that can be ionized and may be represented by $Li^+X^-$. Although a negative ion of the lithium salt is not particularly restricted, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CH_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, or $(CF_3CF_2SO_2)_2N^-$ may be illustrated.

Hereinafter, the present invention will be described with reference to the following examples. These examples are provided only for easier understanding of the present invention and should not be construed as limiting the scope of the present invention.

Example 1

As shown in FIG. 3, a laminated/stacked type electrode assembly including eight unit cells was manufactured.

Among the unit cells, one high heat-generating unit cell was disposed at the center of the electrode assembly, and seven low heat-generating unit cells were disposed on both sides of the high heat-generating unit cell, thereby completing an electrode assembly including all eight unit cells.

The high heat-generating unit cell includes a positive electrode prepared using 75 weight % of $LiNi_{0.8}Co_{0.1}Mn_{0.1}O_2$ as a positive electrode active material, 5 weight % of Super C as a conductive agent, 15 weight % of polyethylene oxide (PEO) as a solid electrolyte, 5 weight % of polyvinylidene fluoride (PVDF) as a binder; and a negative electrode prepared using 71 weight % of artificial graphite as a negative electrode active material, 2 weight % of Super C as a conductive agent, 23 weight % of polyethylene oxide (PEO) as a solid electrolyte, and 4 weight % of styrene-butylene rubber (SBR)+carboxymethyl cellulose (CMC) as a binder.

The low heat-generating unit cell includes a positive electrode prepared using 85 weight % of $LiNi_{0.8}Co_{0.1}Mn_{0.1}O_2$ as a positive electrode active material, 3 weight % of Super C as a conductive agent, 8 weight % of polyethylene oxide (PEO) as a solid electrolyte, 4 weight % of polyvinylidene fluoride (PVDF) as a binder; and a negative electrode prepared using 83 weight % of artificial graphite as a negative electrode active material, 1 weight % of Super C as a conductive agent, 13 weight % of polyethylene oxide (PEO) as a solid electrolyte, and 3 weight % of styrene-butylene rubber (SBR)+carboxymethyl cellulose (CMC) as a binder.

A solid electrolyte layer interposed between the positive electrode and the negative electrode was prepared and used by dissolving polyethylene oxide and LiFSI in acetonitrile at a ratio of 20 mol % and 1 mol % and casting them thinly on a glass plate, followed by vacuum-drying to a thickness of 100 μm.

Example 2

An electrode assembly was manufactured using the same method as Example 1, except that the number of high heat-generating unit cells was two and the number of low heat-generating unit cells was six.

Example 3

An electrode assembly was manufactured using the same method as Example 1, except that the number of high heat-generating unit cells was three and the number of low heat-generating unit cells was five.

Example 4

An electrode assembly was manufactured using the same method as Example 1, except that the number of high heat-generating unit cells was four and the number of low heat-generating unit cells was four.

Comparative Example 1

As shown in FIG. 3, a laminated/stacked type electrode assembly including eight unit cells was manufactured.

The unit cells all include electrodes having the same heat generation property.

In particular, the unit cell includes a positive electrode prepared using 80 weight % of $LiNi_{0.8}Co_{0.1}Mn_{0.1}O_2$ as a positive electrode active material, 4 weight % of Super C as a conductive agent, 10 weight % of polyethylene oxide (PEO) as a solid electrolyte, 6 weight % of polyvinylidene fluoride (PVDF) as a binder; and a negative electrode prepared using 77 weight % of artificial graphite as a negative electrode active material, 1.5 weight % of Super C as a conductive agent, weight % of polyethylene oxide (PEO) as a solid electrolyte, and 3.5 weight % of styrene-butylene rubber (SBR)+carboxymethyl cellulose (CMC) as a binder.

The electrode assembly of Comparative Example 1 was designed to have the same capacity as the electrode assemblies of Examples 1 to 4 at room temperature.

Experimental Example 1

In order to confirm the improved level of low-temperature capacity of the electrode assembly including the high heat-generating electrode, secondary batteries including the electrode assemblies manufactured in Examples 1 to 4 and Comparative Example 1 were fully charged and fully discharged at −10° C. FIG. 4 shows a graph showing the ratio of the improved capacity based on the capacity of Comparative Example 1.

Referring to FIG. 4, it can be seen that the capacity of the battery increases as the number of high heat-generating unit cells increases.

Since the experiment was conducted under low temperature conditions, it can be confirmed that the capacity improvement effect at low temperature is excellent in the case of the present invention.

Example 5

As shown in FIG. 3, a laminated/stacked type electrode assembly including eight unit cells was manufactured.

Among the unit cells, four high heat-generating unit cells were disposed at the center of the electrode assembly, and two low heat-generating unit cells were disposed each side of the high heat-generating unit cell, thereby completing an electrode assembly including all eight unit cells.

The high heat-generating unit cell includes a negative electrode prepared using 80 weight % of natural graphite as a negative electrode active material, 2 weight % of Super C as a conductive agent, 13 weight % of polyethylene oxide (PEO) as a solid electrolyte, and 5 weight % of styrene-butylene rubber (SBR)+carboxymethyl cellulose (CMC) as a binder; and a positive electrode prepared using 80 weight % of $LiNi_{0.8}Co_{0.1}Mn_{0.1}O_2$ as a positive electrode active material, 4 weight % of Super C as a conductive agent, 10 weight % of polyethylene oxide (PEO) as a solid electrolyte, 6 weight % of polyvinylidene fluoride (PVDF) as a binder.

The low heat-generating unit cell was manufactured using the same method as the high heat-generating unit cell, except that artificial graphite was used instead of natural graphite, which was the negative electrode active material used for the high heat generating unit cell.

A solid electrolyte layer interposed between the positive electrode and the negative electrode was prepared and used by dissolving polyethylene oxide and LiFSI in acetonitrile at a ratio of 20 mol % and 1 mol % and casting them thinly on a glass plate, followed by vacuum-drying to a thickness of 100 μm.

Example 6

An electrode assembly was manufactured using the same method as Example 5, except that soft carbon was used instead of natural graphite used for the high heat-generating negative electrode in Example 5.

Example 7

An electrode assembly was manufactured using the same method as Example 5, except that hard carbon was used instead of natural graphite used for the high heat-generating negative electrode in Example 5.

Comparative Example 2

As shown in FIG. 3, a laminated/stacked type electrode assembly including eight unit cells was manufactured.

The unit cells all include electrodes having the same heat generation property.

In particular, the electrode assembly was manufactured using the same positive electrode and solid electrolyte as in Example 5, except that a negative electrode including artificial graphite as the negative electrode active material was applied to the unit cell.

The electrode assembly of Comparative Example 2 was designed to have the same capacity as the electrode assemblies of Examples 5 to 7 at room temperature.

Experimental Example 2

In order to confirm the improved level of low-temperature capacity by applying a negative electrode active material with different heat generating properties, secondary batteries including the electrode assemblies manufactured in Examples 5 to 7 and Comparative Example 2 were fully charged and fully discharged at −10° C. FIG. 5 shows a graph showing the ratio of the improved capacity based on the capacity of Comparative Example 2.

Referring to FIG. 5, it can be seen that there is an effect of increasing the capacity of the battery according to the type of the negative electrode active material. In particular, it is confirmed that the capacity of the battery increases in the order of natural graphite, soft carbon and hard carbon.

Since the experiment was conducted under low temperature conditions, it can be confirmed that the capacity improvement effect at low temperature is excellent in the case of the present invention.

Comparative Example 3

An electrode assembly was manufactured using the same method as Example 1, except that two high heat-generating unit cells manufactured in Example 1 were disposed at both ends of the electrode assembly and six low heat-generating unit cells manufactured in Example 1 were disposed at the center of the electrode assembly so as to have a laminated/stacked electrode assembly including eight unit cells as shown in FIG. 3.

Experimental Example 3

In order to confirm the improved level of battery capacity according to the location of high heat-generating electrode, secondary batteries including the electrode assemblies manufactured in Example 2 and Comparative Example 3 were fully charged and fully discharged at −10° C. FIG. 6 shows a graph showing the ratio of the improved capacity based on the capacity of Comparative Example 1.

Referring to FIG. 6, it can be seen that the secondary battery including the electrode assembly of Example 2 has a capacity improvement effect of about 3.5% compared to the secondary battery including the electrode assembly composed of only the electrodes of Comparative Example 1 with uniform heat generation.

However, the secondary battery including the electrode assembly of Comparative Example 3, in which the high heat-generating unit cells were disposed only at both ends of the electrode assembly, appears to have a lower battery capacity than the secondary battery including the electrode assembly of Comparative Example 1.

Therefore, it can be seen that when the number of high heat-generating electrodes is the same, a capacity-increasing effect is remarkably increased when the high heat-generating electrodes are disposed at the center of the electrode assembly rather than disposed at both ends of the electrode assembly.

A person having ordinary skill in the art to which the present invention pertains will appreciate that various applications and modifications are possible based on the above description without departing from the scope of the present invention.

DESCRIPTION OF REFERENCE NUMERALS

100, 110, 200, 300: Electrode assemblies
101, 101', 111: Positive electrodes
102, 112, 112': Negative electrodes
103, 113, 290, 390: Solid electrolyte layers
210, 220, 230, 240, 250, 260, 270, 280, 310, 320, 330, 340, 350, 360, 370, 380: Unit cells
291: Fixing tape

INDUSTRIAL APPLICABILITY

As is apparent from the above description, an all-solid-state secondary battery including a composite electrode according to the present invention partially includes an electrode generating a large amount of heat, and thus, the overall temperature increase effect can be obtained due to the thermal energy generated during normal use of the battery.

In addition, by applying an electrode assembly including both a high heat-generating electrode and a low heat-generating electrode, it is possible to maintain not only the temperature increase effect by the high heat-generating electrode, but also the lifespan improvement effect by the low heat-generating electrode.

In addition, since a separate heat generation member is not added for heat generation, an additional external power source is not required, so that the volume of the battery can be prevented from increasing to provide the external power source.

The invention claimed is:

1. An all-solid-state battery comprising:
an electrode assembly; and
a solid electrolyte,
wherein
the electrode assembly comprises a structure in which a plurality of plate-shaped electrodes are stacked;
the plurality of electrodes include a first electrode and a second electrode, wherein the first electrode generates more heat than the second electrode, and wherein the first electrode is disposed in a center of the electrode assembly; and
an active material of the first electrode and an active material of the second electrode are negative electrode materials,
when the negative electrode active materials are listed in order from high heat generation to low heat generation, it is in the order of hard carbon, soft carbon, artificial graphite, natural graphite coated with artificial graphite, natural graphite, and silicon oxide,
wherein the active material of the first electrode is a relatively high heat generation negative electrode active material, and the active material of the second electrode is a relatively low heat generation negative electrode active material.

2. An all-solid-state battery comprising:
an electrode assembly; and
a solid electrolyte,
wherein
the electrode assembly comprises a structure in which a plurality of plate-shaped electrodes are stacked;
the plurality of plate shaped electrodes include a positive electrode and a negative electrode,
the positive electrode includes a first positive electrode and a second positive electrode, and the negative electrode includes a first negative electrode and a second negative electrode,
wherein the first positive electrode and the second positive electrode have a difference in the amount ratio of the solid electrolyte, and include a uniform positive active material,
wherein the first negative electrode and the second negative electrode have a difference in the amount ratio of the solid electrolyte, and include a uniform negative active material,
wherein the first positive electrode generates more heat than the second positive electrode, and wherein the first positive electrode is disposed in a center of the electrode assembly, and
wherein the first negative electrode generates more heat than the second negative electrode, and wherein the first negative electrode is disposed in a center of the electrode assembly,
the electrode assembly is a stacked type electrode assembly; and
wherein the first positive electrode, the second positive electrode, the first negative electrode, and the second negative electrode comprise a solid electrolyte, and
wherein an amount ratio of the solid electrolyte based on total solid content in the first positive electrode and the first negative electrode is higher than an amount ratio of the solid electrolyte based on total solid content in the second positive electrode and the second negative electrode, respectively.

3. An all-solid-state battery comprising:
an electrode assembly; and
a solid electrolyte,
wherein
the electrode assembly comprises a structure in which a plurality of plate-shaped electrodes are stacked;
the plurality of plate shaped electrodes include a positive electrode and a negative electrode,
the positive electrode includes a first positive electrode and a second positive electrode, and the negative electrode includes a first negative electrode and a second negative electrode,
wherein the first positive electrode and the second positive electrode have a difference in the amount ratio of the solid electrolyte, and include a uniform positive active material,
wherein the first negative electrode and the second negative electrode have a difference in the amount ratio of the solid electrolyte, and include a uniform negative active material,
wherein the first positive electrode generates more heat than the second positive electrode, and wherein the first positive electrode is disposed in a center of the electrode assembly, and
wherein the first negative electrode generates more heat than the second negative electrode, and wherein the first negative electrode is disposed in a center of the electrode assembly,
the electrode assembly is a laminated/stacked type electrode assembly or a stacked/folded type electrode assembly comprising a plurality of unit cells, the plurality of unit cells configured to have a first unit cell including the first electrode and a second unit cell including the second electrode; and
wherein the first positive electrode, the second positive electrode, the first negative electrode, and the second negative electrode comprise a solid electrolyte, and
wherein an amount ratio of the solid electrolyte based on total solid content in the first positive electrode and the first negative electrode is higher than an amount ratio of the solid electrolyte based on total solid content in the second positive electrode and the second negative electrode, respectively.

4. The all-solid-state battery according to claim 1, wherein
the electrode assembly is a stacked type electrode assembly.

5. The all-solid-state battery according to claim 1, wherein
the electrode assembly is a laminated/stacked type electrode assembly or a stacked/folded type electrode assembly comprising a plurality of unit cells; and
the plurality of unit cells are configured to have a first unit cell including the first electrode and a second unit cell including the second electrode.

6. The all-solid-state battery according to claim 5, wherein each of the first unit cell and the second unit cell includes a uniform active material.

7. The all-solid-state battery according to claim 1, wherein the first electrode and the second electrode are positive electrodes or negative electrodes, or positive electrodes and negative electrodes.

8. The all-solid-state battery according to claim 1, wherein the solid electrolyte is a sulfide-based solid electrolyte, an oxide-based solid electrolyte or a polymer-based solid electrolyte.

9. The all-solid-state battery according to claim 1, wherein a temperature of the first electrode is transferred to the second electrode to increase an internal temperature of the battery.

10. The all-solid-state battery according to claim 1, wherein the all-solid-state battery comprising the electrode assembly comprising the first electrode and the second electrode has a larger capacity at subzero temperatures compared to an all-solid-state battery composed of a single-type electrode and having the same capacity at room temperature.

11. A battery pack comprising the all-solid-state battery according to claim 1.

12. A device comprising the battery pack according to claim 11, wherein the device is selected from a group consisting of mobile electronic devices, wearable electronic devices, tablet computers, laptop computers, electric vehicles, and power storage devices.

* * * * *